United States Patent [19]

Nelson et al.

[11] Patent Number: 4,548,258
[45] Date of Patent: Oct. 22, 1985

[54] METHOD AND MEANS FOR INHIBITING CORROSION IN A HEAT PIPE

[75] Inventors: John A. Nelson, Benton Township, Berrien County; Joan D. Banks, Oronoko Township, Berrien County, both of Mich.

[73] Assignee: Whirlpool Corporation, Benton Harbor, Mich.

[21] Appl. No.: 627,345

[22] Filed: Jul. 2, 1984

[51] Int. Cl.⁴ .......................................... F28F 19/02
[52] U.S. Cl. ................................ 165/1; 165/104.21; 165/133
[58] Field of Search ................. 165/104.21, 133, 1

[56] References Cited

U.S. PATENT DOCUMENTS

| | | |
|---|---|---|
| 1,405,320 | 1/1922 | Pedersen . |
| 2,411,676 | 11/1946 | Burghart . |
| 2,582,129 | 1/1952 | Jacoby . |
| 2,864,731 | 12/1958 | Gurinsky et al. ................... 165/133 |
| 3,171,789 | 3/1965 | Wanklyn et al. . |
| 3,503,438 | 3/1970 | Geyer . |
| 3,672,020 | 6/1972 | Freggens ............................ 165/133 |
| 3,884,296 | 5/1975 | Basiulis . |
| 3,986,950 | 10/1976 | Orofino . |
| 4,043,387 | 8/1977 | Lamp . |
| 4,219,070 | 8/1980 | Kurokawa et al. . |
| 4,351,388 | 9/1982 | Calhoun et al. . |

FOREIGN PATENT DOCUMENTS

| | | | |
|---|---|---|---|
| 109650 | 8/1979 | Japan | 165/133 |
| 109651 | 8/1979 | Japan | 165/133 |

OTHER PUBLICATIONS

"The Heat Pipe", Scientific American, vol. 28, 1968, by G. Yale Eastman.

Primary Examiner—Albert W. Davis, Jr.
Attorney, Agent, or Firm—Wood, Dalton, Phillips, Mason & Rowe

[57] ABSTRACT

An improved corrosion-inhibiting system for use in heat pipes operating at relatively high temperatures, such as 300° F. to 500° F. In the illustrated embodiment, a corrosion inhibitor aqueous solution is provided having approximately 1% to 5% by weight sodium chromate. Glass which goes into solution into the sodium chromate at temperature of approximately 300° F. and above is included in the system. The solution of the glass in the sodium chromate solution permits the glass to be carried to the condenser portion of the heat pipe in small solution droplets which are transported by the vaporized fluid so as to be adsorbed in the protective layer on the inner surface of the heat pipe tube. Glass dissolved in the boiling liquid solution is adsorbed on the wall surface in the evaporator portion of the heat pipe. Pyrex glass has been found to provide excellent results in the system.

27 Claims, 5 Drawing Figures

METHOD AND MEANS FOR INHIBITING CORROSION IN A HEAT PIPE

BACKGROUND OF THE INVENTION

1. Field of the Invention

This invention relates to heat pipes and in particular to a method and means for inhibiting corrosion within a heat pipe. The method and means is advantageously adapted for use with heat pipes such as used in domestic furnaces.

2. Description of the Background Art

In one well-known form of heat pipe, water is provided in a sealed enclosure which defines, at one end, an evaporator portion and at the opposite end, a condenser portion. When used in conventional domestic furnace, the evaporator portion is heated by flue gases and the condenser portion is cooled by the circulating air to be heated. Such heat pipes are advantageously adapted for use in furnaces as they are capable of transferring large amounts of heat in a small amount of space. However, a serious problem arises in that while such heat pipes have conventionally been formed of stainless steel, the water preferentially used as the heat transfer medium tends to corrode the pipe at the elevated temperatures normally involved in the operation thereof as a heat pipe in a furnace. The corrosion produces hydrogen, which when present in a sufficient amount, interferes with the efficiency and operating parameters of the heat pipe. Illustratively in a furnace, it is desirable to operate the heat pipe at temperatures of over 300° F. and up to approximately 500° F., with an average temperature of operation being approximately 425° F.

Another problem is the potential freezing of the water in the heat pipe and bursting of the heat pipe when the unit is installed where the ambient temperature may drop below 32° F. at times.

A still further problem arises in the chemical reaction involved when the water reacts with the iron of the heat pipe inner surface portion to form successively FeO, $Fe_3O_4$, and $Fe_2O_3$, in each of which formations hydrogen is evolved. The evolution of the hydrogen interferes with efficient condensing action in the heat pipe by blocking the path to the upper part of the condenser and, thus, the overall efficiency of the furnace is reduced.

One attempted solution to the problem of preventing corrosion caused by subjection of metals to aqueous liquids is to dissolve therein alkali metal chromates. One such method is illustrated in U.S. Pat. No. 1,405,320 of Arthur Z. Pedersen, wherein a mixture of calcium chloride and potassium chromate is dissolved in an antifreeze mixture.

In U.S. Pat. No. 2,411,676, Lloyd M. Burghart discloses a corrosion inhibiting composition and method for aqueous antifreeze solutions, such as used in the cooling systems of internal combustion engines. Burghart teaches the use of an alkali metal borate and a compound of the group consisting of alkali metal chromates and dichromates, together with a compound of the group consisting of alkali metal orthosilicates, alkali metal silico-fluorides, and aluminum alkali metal silico-fluorides.

Arthur L. Jacoby discloses, in U.S. Pat. No. 2,582,129, a corrosion inhibiting composition comprising an aqueous solution of sodium chromate and sodium nitrate.

John Nelson Wanklyn et al, in U.S. Pat. No. 3,171,789, teach the method of inhibiting corrosion by introducing boric acid into steam.

While a number of attempts have been made to solve the vexatious problem of corrosion of metal, such as ferrous metals forming heat pipes and the like, none has proven completely satisfactory.

SUMMARY OF THE INVENTION

The present invention comprehends an improved method and means for preventing corrosion of the inner surface portion of a heat pipe in a novel and simple manner.

More specifically, the invention comprehends the method of preventing corrosion of the inner surface of a heat pipe by an aqueous heat transfer liquid in the enclosure, including the steps of dissolving a first corrosion-inhibiting material in the liquid to form an inhibitor solution for inhibiting corrosion of the inner surface of the enclosure and providing a second corrosion-inhibiting material in the enclosure selected from coating materials which dissolve in the inhibitor solution at a temperature greater than the boiling temperature of the inhibitor solution for deposition on the inner surface portion to form a coating thereon effectively preventing corrosion thereof by the aqueous liquid at temperatures above the boiling temperature thereof.

In the illustrated embodiment, the heat transfer liquid comprises water, the first corrosion-inhibiting material comprises sodium chromate, and the second corrosion-inhibiting material comprises glass.

In the illustrated embodiment, the sodium chromate is present in the amount of approximately 1% to 5% by weight in the solution.

In the illustrated embodiment, the glass material comprises Pyrex ® brand glass, and in one illustrated form, comprises a glass rod.

The sealed enclosure is made to be free of noncondensable gases and is maintained free of hydrogen by the action of the sodium chromate during the operation of the heat pipe.

The invention comprehends that the glass dissolve in the sodium chromate solution at an elevated temperature, such as approximately 300° F. and be carried upwardly with the portion of the solution boiled off therefrom to deposit on the inner surface portion of the enclosure above the liquid solution level.

The dissolved glass in the liquid solution further coats the portion of the heat pipe holding the liquid solution as a result of turbulence, diffusion, and adsorption in this region of the inner surface portion thereof.

It has been found that the glass forms a continuous coating over the inner surface portion of the enclosure and any rupture which occurs at operating temperatures, i.e. temperatures at which the glass will be dissolved in the liquid inhibitor solution, becomes immediately repaired by the adsorption of the glass on the enclosure surface portion. Any ruptures in the glass coating which occur at times of nonoperation or at temperatures below the melting temperature of the glass will be repaired substantially immediately upon the system reaching the operating temperatures, wherein the glass is dissolved in the inhibitor solution as discussed above.

The method and means for effecting the improved corrosion inhibition in a heat pipe of the present invention is extremely simple and economical while yet providing the highly effective solution to the vexatious problem of corrosion found in such heat pipes of the prior art.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
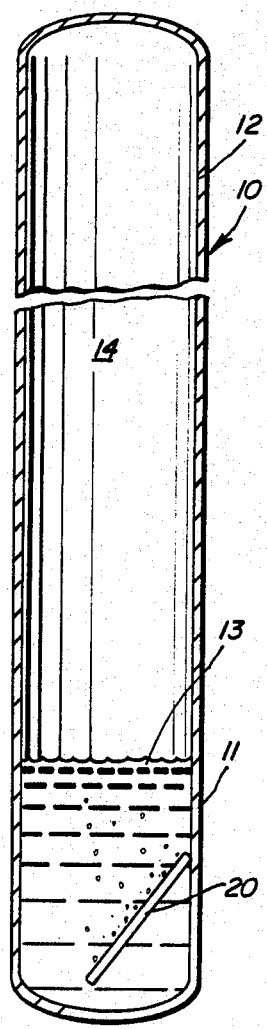
FIG. 1 is a diametric section of a heat pipe and provided with corrosion-inhibiting means embodying the invention.

In the illustrative embodiment of the invention as disclosed in the drawing, a heat pipe generally designated 10 defines a lower evaporator portion 11 and an upper condenser portion 12. The heat pipe is advantageously adapted for use in a furnace wherein the evaporator portion is heated by the products of combustion, and the condenser portion is in heat transfer association with the air to be heated.

In the illustrated embodiment, the heat transfer medium within the heat pipe comprises a body of water 13. While water is favored as a heat pipe fluid because of its excellent thermo-dynamic properties, lack of odor, non-toxicity, ready availability, and low cost, it presents serious problems relative to corrosion of the heat pipe walls, particularly at the elevated temperatures involved in the operation thereof. Further, water presents the problem of freezing at low temperatures.

It has been conventional to manufacture heat pipes of stainless steel in order to minimize the corrosion. Notwithstanding this, substantial corrosion does occur in the operation of the heat pipe where pure water is used. The present invention provides novel corrosion-inhibiting means preventing such corrosion in a novel and simple manner.

More specifically, the present invention comprehends the provision of sodium chromate and a body of glass in the water. The aqueous solution and the vapor space 14 in the tube are caused to be free of noncondensable gases prior to sealing of the tube with the aqueous sodium chromate solution and glass body therein. In the illustrated embodiment, the glass material comprises a rod of Pyrex ® brand glass preselected to melt, or dissolve, in the aqueous sodium chromate solution at temperatures of approximately 300° F. The dissolved glass is carried by the droplets rising in the vapor space 14 through the vigorous boiling action of the solution in the evaporator 11 to the upper portion 12 of the heat pipe to be deposited on and coat the inner surface of the heat pipe wall with a protective layer, or coating of deposited glass. FIGS. 1–4 show the various stages of the described action in a heat pipe. FIG. 1 shows the heat pipe 10 at room temperature before it has been operated for the first time. At room temperature there is not heat transfer from the evaporator 11 to the condenser 12, and there is no turbulence in the water sodium chromate solution 13. The glass rod 20 has virtually no solubility at this temperature.

Figure 2:
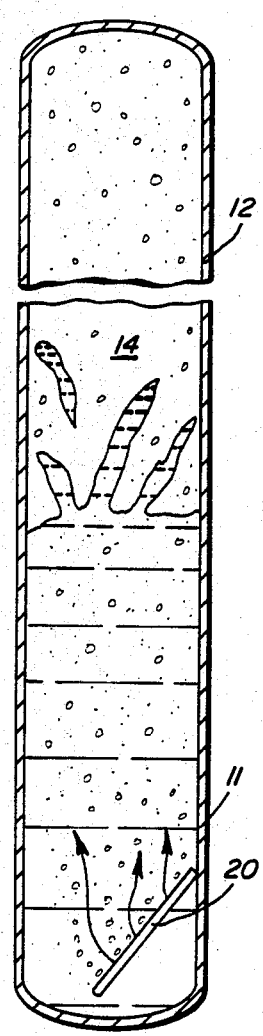
FIG. 2 is a view similar to that of FIG. 1 illustrating an intermediate stage in the development of the protective glass coating on the inner surface of the heat pipe for inhibiting corrosion thereof.

The glass rod increases in solubility as the temperature increases. FIG. 2 illustrates the operation of the heat pipe at about 300° F. The glass rod is dissolving into the solution. The solution is being carried by the vigorous boiling action to the upper parts of the heat pipe. As these upper parts are cooler the glass starts to adsorb and deposit on the walls. This is indicated in FIG. 2 in which the glass rod 20 is dissolving to reach equilibrium at about 300° F. and there are water vapor bubbles rising to the turbulent zone at the surface of the water-sodium chromate solution. In the upper part of the heat pipe there are water droplets which contain dissolved glass, there are starting deposits of glass 20a on the heat pipe walls, and there is condensed water running down the walls of the heat pipe.

Figure 3:
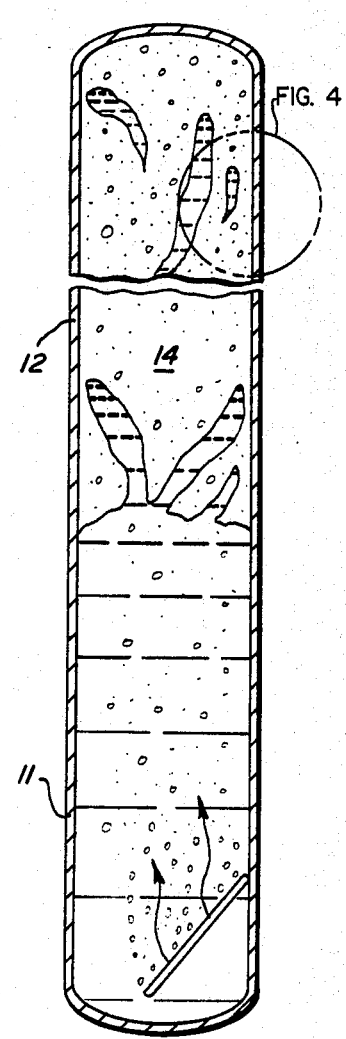
FIG. 3 is a view similar to that of FIG. 2 showing the formation of the glass coating in a further stage of operation of the heat pipe.
Figure 4:
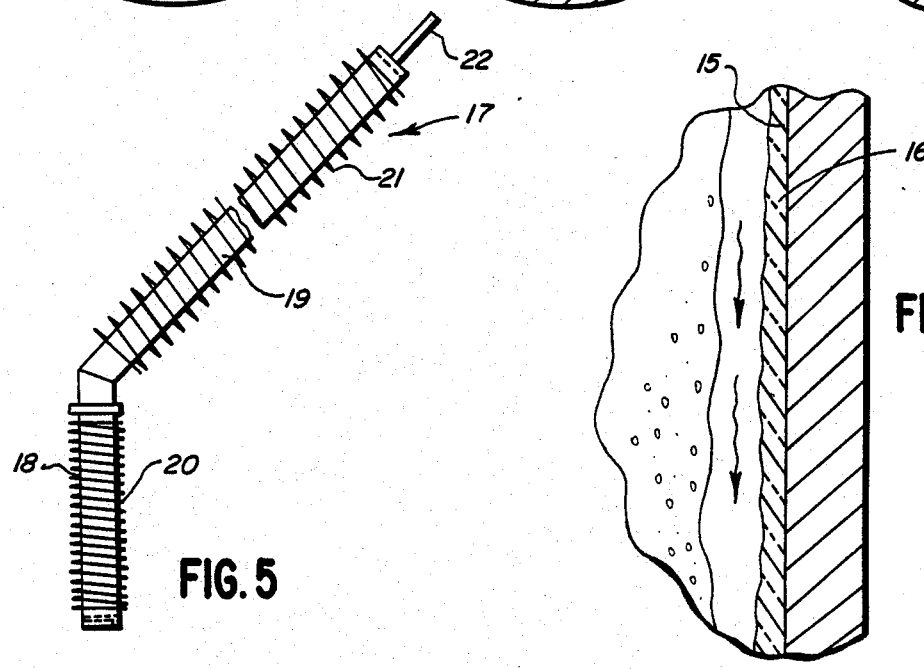
FIG. 4 is a fragmentary enlarged section illustrating in greater detail the formation of the protective glass coating on the inner surface of the heat pipe wall.

As the heat pipe is increased in temperature to its operating temperature the solubility of the glass rod increases as more heat is transferred as shown in FIG. 3. At this time there are vapor bubbles in the solution in the evaporator portion of the heat pipe. The water-sodium chromate solution is saturated with glass dissolved from the glass rod. There is vigorous boiling action at the surface of the water-sodium chromate solution and there are water droplets being splashed against the upper walls. In time at the operating temperature an equilibrium is reached. This is illustrated in FIG. 4 where the amount of glass being transferred from the solution to the condenser is equal to the amount of glass moving down the walls of the heat pipe. The glass adsorbed and deposited on the walls of the heat pipe is in equilibrium with the glass concentration in solution. A dynamic balance is reached and the glass being dissolved into solution from the glass rod is equal to the glass being deposited on the glass rod from solution. When the dynamic balance is reached the glass coating 16 protects the walls of the upper portion of the heat. When the dynamic balance is reached the glass coating 16 protects the walls in both the condenser and evaporator regions of the heat pipe since the coating 16 is also deposited on the surface 15 in the lower portion 11 of the heat pipe as a result of turbulence, diffusion and adsorption from the boiling solution.

Upon formation of the coating 16, the heat pipe tube wall is effectively protected against corrosion. Should any rupture occur in the coating 16, the rupture will be immediately repaired by the deposition of further glass from the heat transfer fluid droplets in the upper portion of the heat tube and by adsorption of the glass from the solution in the lower portion in the continuing operation of the heat pipe or when the heat pipe is operated again. This reforming of the glass coating is called "self healing". Thus, the system is self-generating and maintaining so as to provide a long, trouble-free, corrosion-resistant protection of the heat pipe tube wall.

In the illustrated embodiment, the sodium chromate is present in the amount of approximately 1% to 5% by weight in the aqueous solution. This water-sodium chromate solution is effective at temperatures from room temperature to about 300° F. The glass coating is effective from about 300° F. to operating temperature, about 425° F. The present invention employs these two effects to provide the corrosion protection which allows the heat pipe to function free of corrosion problems. The corrosion protection is a result of the reduction of the corrosion rate (i.e. hydrogen generation rate) to such a small value over the operational range that the chromate can easily getter any hydrogen produced. Thus the present invention provides for protection against freezing at low temperatures, protection against corrosion of the heat pipe wall, and gettering of any hydrogen which may form as a result of possible reaction of the water with the iron of the heat pipe wall.

In the normal operation of such a heat pipe, the temperature thereof is an average of approximately 425° F. and, thus, at a temperature which is conductive to oxidizing any iron which is exposed to the aqueous solution. It is important that any hydrogen which may result from oxidation of the iron be removed so as to not interfere with the condensing action and thereby lower the efficiency of the heat pipe. The sodium chromate removes any free hydrogen by forming sodium hydroxide and chromium oxide in the presence of hydrogen.

Because of the improved corrosion-prevention characteristics of the glass coating and sodium chromate solution, the heat pipe wall may be formed not only of stainless steel but mild steel while remaining substantially free of such corrosion.

The invention is advantageously adapted for preventing corrosion of heat pipe walls formed of nickel alloys as well as ferrous alloys. The invention comprehends utilizing glasses which contain $SiO_2$ and which are capable of being dissolved by the sodium chromate solution.

The deposition of the glass on the heat pipe wall surface 15 will continue by adsorption thereon until the chemical potential of the material on the surface is equal to the chemical potential of the material in the solution. It has been found that after a period of time, the adsorbed layer becomes gel-like in consistency. In the illustrated embodiment, the glass is provided in the form of a rod disposed in the sodium chromate solution. As will be obvious to those skilled in the art, the glass may be provided in any form, such as glass beads, etc.

Figure 5:
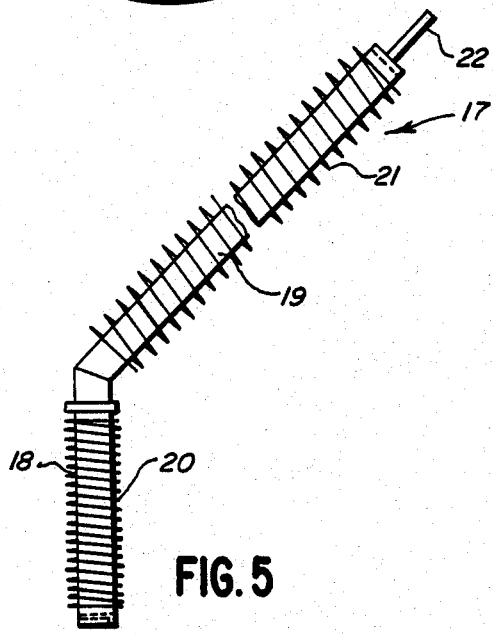
FIG. 5 is an elevation of the heat pipe embodying the invention having angularly related portions.

As shown in FIG. 5, one improved form of heat pipe embodying the invention for use in a domestic furnace comprises a heat pipe generally designated 17 having a lowermost evaporator portion 18 and an upper condenser portion 19 extending at an angle of approximately 45° to the evaporator portion. The evaporator portion is provided with a concentric heat transfer helical fin 20 having relatively closely spaced turns, and the condenser portion is provided with a concentric stainless steel helical fin 21 having more widely spaced turns for improved heat transfer association with the air to be heated.

In use, the condenser portion 19 may be extended at an angle to the upright as shown in FIG. 5 to save space in such applications as domestic furnaces.

A process stub 22 is provided at the upper end of the condenser portion through which the sodium chromate solution and glass material may be introduced. Upon removal of the noncondensable gases in the heat pipe, the process tube may be sealingly closed.

In one example, the sodium chromate solution comprised a 1% by weight solution in water, with the glass being present in the form of a Pyrex ® brand rod. Excellent corrosion-resistant characteristics were obtained at temperatures up to 500° F.

The invention comprehends the use of glass including sodium borate and aluminum oxide.

In one use of the corrosion-inhibiting system of the present invention wherein the sodium chromate was present as a 1% by weight solution, the heat pipe was formed of 304 stainless steel and a Pyrex ® brand glass rod was utilized, it was found that the corrosion rate of the stainless steel was reduced 33 times at a temperature of 300° F. and 1200 times at a temperature of 500° F.

The foregoing disclosure of specific embodiments is illustrative of the broad inventive concepts comprehended by the invention.

We claim:

1. In a heat pipe having a sealed enclosure defining an evaporator portion and a condenser portion, said enclosure further defining an inner surface portion, and a vaporizable heat transfer liquid in said evaporator portion selected from liquids having a boiling point no higher than a preselected operating temperature of the heat pipe, the improvement comprising corrosion-inhibiting means within said enclosure comprising
   a coating on said inner surface comprised essentially solely of material which dissolves in the heat transfer liquid at the existing temperature of the heat transfer liquid permitting deposition of said material on said inner surface portion to form said coating thereon effectively preventing corrosion of said inner surface portion by said liquid at said operating temperature of the heat pipe.

2. The heat pipe structure of claim 1 wherein said temperature at which said coating material dissolves is approximately 300° F.

3. In a heat pipe having a sealed enclosure defining an evaporator portion and a condenser portion, said enclosure further defining an inner surface portion, and a vaporizable heat transfer liquid in said evaporator portion selected from liquids having a boiling point below a preselected temperature, the improvement comprising corrosion-inhibiting means within said enclosure comprising:
   a first corrosion-inhibiting material dissolved in said liquid for forming an inhibitor solution for inhibiting corrosion of said inner surface portion of the enclosure by said heat transfer liquid; and
   a second corrosion-inhibiting material in said enclosure selected from coating materials which dissolve in the inhibitor solution at approximately said preselected temperature for deposition on said inner surface portion to form a coating thereon effectively preventing corrosion of said inner surface portion by said liquid at temperatures above said preselected temperature, said liquid comprising water, said inner surface being ferrous, and said first corrosion-inhibiting material comprising sodium chromate.

4. The heat pipe structure of claim 3 wherein said liquid comprises water, said inner surface is ferrous, and said first corrosion-inhibiting material comprises sodium chromate forms a solution in the range of approximately 1% to 5% thereof in said water.

5. In a heat pipe having a sealed enclosure defining an evaporator portion and a condenser portion, said enclosure further defining an inner surface portion, and a vaporizable heat transfer liquid in said evaporator portion selected from liquids having a boiling point below a preselected temperature, the improvement comprising corrosion-inhibiting means within said enclosure comprising:
   a first corrosion-inhibiting material dissolved in said liquid for forming an inhibitor solution for inhibiting corrosion of said inner surface portion of the enclosure by said heat transfer liquid; and a second corrosion-inhibiting material in said enclosure selected from coating materials which dissolve in the inhibitor solution at approximately said preselected temperature for deposition on said inner surface portion to form a coating thereon effectively preventing corrosion of said inner surface portion by said liquid at temperatures above said preselected temperature, said second corrosion-inhibiting material comprising glass.

6. The heat pipe structure of claim 5 wherein said glass comprises Pyrex ® glass.

7. The heat pipe structure of claim 5 wherein said second corrosion-inhibiting glass material comprises a Pyrex ® glass rod.

8. The heat pipe structure of claim 5 wherein said second corrosion-inhibiting glass material comprises glass containing borate and aluminum oxide.

9. In a heat pipe having a sealed enclosure defining an evaporator portion and a condenser portion, said enclosure further defining an inner surface portion, and a vaporizable heat transfer liquid in said evaporator portion selected from liquids having a boiling point below a preselected temperature, the improvement comprising corrosion-inhibiting means within said enclosure comprising:
a first corrosion-inhibiting material dissolved in said liquid for forming an inhibitor solution for inhibiting corrosion of said inner surface portion of the enclosure by said heat transfer liquid; and
a second corrosion-inhibiting material in said enclosure selected from coating materials which dissolve in the inhibitor solution at approximately said preselected temperature for deposition on said inner surface portion to form a coating thereon effectively preventing corrosion of said inner surface portion by said liquid at temperatures above said preselected temperature, said sealed enclosure being free of noncondensable gases.

10. In a heat pipe having a sealed enclosure defining an evaporator portion and a condenser portion, said enclosure further defining an inner surface portion, and a vaporizable heat transfer liquid in said evaporator portion selected from liquids having a boiling point below a preselected temperature, the improvement comprising corrosion-inhibiting means within said enclosure comprising:
a first corrosion-inhibiting material dissolved in said liquid for forming an inhibitor solution for inhibiting corrosion of said inner surface portion of the enclosure by said heat transfer liquid; and
a second corrosion-inhibiting material in said enclosure selected from coating materials which dissolve in the inhibitor solution at approximately said preselected temperature for deposition on said inner surface portion to form a coating thereon effectively preventing corrosion of said inner surface portion by said liquid at temperatures above said preselected temperature, said first corrosion-inhibiting material being present in a quantity preselected to prevent solidification of said liquid at a temperature substantially below the normal solidification temperature of said liquid.

11. The heat pipe structure of claim 3 wherein said first corrosion-inhibiting material will getter any hydrogen produced in a reaction between said water in said heat pipe enclosure and said ferrous inner surface of said heat pipe enclosure.

12. In a heat pipe having a sealed enclosure defining an evaporator portion and a condenser portion, said enclosure further defining a ferrous inner surface portion, and aqueous transfer liquid in said evaporator portion having a boiling point below approximately 300° F., the improvement comprising corrosion-inhibiting means within said enclosure comprising:
sodium chromate dissolved in said heat transfer aqueous liquid forming an inhibitor solution for inhibiting corrosion of said inner surface portion of the enclosure; and
glass material disposed in said enclosure which dissolves in the inhibitor solution at approximately said preselected temperature for deposition on said inner surface portion to form a coating thereon effectively preventing corrosion of said inner surface portion by said liquid at temperature above said preselected temperature.

13. The heat pipe structure of claim 12 wherein said inhibitor solution comprises an approximately 1% to 5% solution of the sodium chromate in said liquid.

14. The heat pipe structure of claim 12 wherein said liquid comprises pure water.

15. The heat pipe structure of claim 12 wherein said glass material comprises Pyrex ® glass.

16. The heat pipe structure of claim 12 wherein said enclosure surface portion is formed of stainless steel.

17. The heat pipe structure of claim 13 wherein said inhibitor solution will getter any hydrogen developed as a result of a reaction between the ferrous inner surface of said enclosure and said aqueous transfer liquid.

18. The method of preventing corrosion of the inner surface of a sealed enclosure defining a heat pipe by an aqueous heat transfer liquid in said enclosure, comprising:
dissolving a first corrosion-inhibiting material in the liquid to form an inhibitor solution for inhibiting corrosion of said inner surface of the enclosure;
dissolving a coating material in said heat transfer liquid selected from coating materials which dissolve in the liquid at a temperature no greater than the operating temperature of said heat pipe; and
causing deposition of a layer consisting essentially solely of said coating material on said inner surface of the heat pipe to define corrosion-inhibiting means thereon effectively preventing corrosion of said inner surface by said aqueous liquid said operating temperature.

19. The method of preventing corrosion of the inner surface of a sealed enclosure defining a heat pipe by an aqueous heat transfer liquid in said enclosure, comprising the steps of:
dissolving a first corrosion-inhibiting material in the liquid to form an inhibitor solution for inhibiting corrosion of said inner surface of the enclosure; and
providing a second corrosion-inhibiting material in said enclosure selected from coating materials which dissolve in the inhibitor solution at a temperature greater than the boiling temperature of said solution for deposition on said inner surface portion to form a coating thereon effectively preventing corrosion thereof by said aqueous liquid at temperatures above said boiling temperature, said second corrosion-inhibiting material comprising glass.

20. The method of preventing corrosion of the inner surface of a heat pipe of claim 19 wherein said second corrosion-inhibiting material comprises Pyrex ® glass.

21. The method of preventing corrosion of the inner surface of a heat pipe of claim 18 wherein said heat pipe is operated at temperatures of up to approximately 500° F.

22. The method of preventing corrosion of the inner surface of a sealed enclosure defining a heat pipe by an aqueous heat transfer liquid in said enclosure, comprising the steps of:
dissolving a first corrosion-inhibiting material in the liquid to form an inhibitor solution for inhibiting corrosion of said inner surface of the enclosure; and
providing a second corrosion-inhibiting material in said enclosure selected from coating materials which dissolve in the inhibitor solution at a temperature greater than the boiling temperature of said solution for deposition on said inner surface portion to form a coating thereon effectively preventing corrosion thereof by said aqueous liquid at temperatures above said boiling temperature, said first corrosion-inhibiting material being provided in sufficient quantity to prevent freezing of said inhibitor solution at temperatures substantially below 32° F.

23. The method of preventing corrosion of the inner surface of a sealed enclosure defining a heat pipe by an aqueous heat transfer liquid in said enclosure, comprising the steps of:
dissolving a first corrosion-inhibiting material in the liquid to form an inhibitor solution for inhibiting corrosion of said inner surface of the enclosure; and
providing a second corrosion-inhibiting material in said enclosure selected from coating materials which dissolve in the inhibitor solution at a temperature greater than the boiling temperature of said solution for deposition on said inner surface portion to form a coating thereon effectively preventing corrosion thereof by said aqueous liquid at temperatures above said boiling temperature, said first corrosion-inhibiting material being provided in sufficient quantity to getter any hydrogen produced in an aqueous heat transfer liquid and heat pipe inner surface reaction.

24. The heat pipe structure of claim 1 wherein said coating material comprises glass.

25. The heat pipe structure of claim 1 wherein said coating material comprises glass and said heat transfer liquid further includes a corrosion-inhibiting material.

26. The heat pipe structure of claim 1 further including a second corrosion-inhibiting material dissolved in said liquid.

27. The method of claim 18 including the further step of dissolving a second corrosion-inhibiting material in said liquid.

* * * * *